US010817207B2

(12) United States Patent
Itagaki et al.

(10) Patent No.: US 10,817,207 B2
(45) Date of Patent: Oct. 27, 2020

(54) MANAGEMENT OF A MULTI-LIBRARY STORAGE SYSTEM

(71) Applicant: International Business Machines Corporation, Armonk, NY (US)

(72) Inventors: Hiroshi Itagaki, Yokohama (JP); Tohru Hasegawa, Tokyo (JP); Shinsuke Mitsuma, Higashimurayama (JP); Tsuyoshi Miyamura, Yokohama (JP); Noriko Yamamoto, Tokyo (JP); Sosuke Matsui, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/108,017

(22) Filed: Aug. 21, 2018

(65) Prior Publication Data

US 2020/0065022 A1    Feb. 27, 2020

(51) Int. Cl.
| G06F 3/00 | (2006.01) |
| G06F 3/06 | (2006.01) |
| G11B 27/10 | (2006.01) |
| G06F 16/13 | (2019.01) |
| G11B 5/008 | (2006.01) |

(52) U.S. Cl.
CPC .......... G06F 3/0649 (2013.01); G06F 3/0614 (2013.01); G06F 3/0686 (2013.01); G06F 16/13 (2019.01); G11B 27/107 (2013.01); G11B 5/00813 (2013.01)

(58) Field of Classification Search
CPC .............................. G06F 3/0649; G06F 16/13
USPC ......................................................... 711/111
See application file for complete search history.

(56) References Cited

U.S. PATENT DOCUMENTS

| 2006/0143393 | A1* | 6/2006 | Petev | G06F 12/122 |
| | | | | 711/133 |
| 2007/0266204 | A1* | 11/2007 | Mizuno | G06F 3/0613 |
| | | | | 711/111 |
| 2008/0015734 | A1 | 1/2008 | Wideman et al. | |
| 2015/0355859 | A1 | 12/2015 | Justiss et al. | |
| 2017/0102885 | A1 | 4/2017 | Lenox | |
| 2017/0364297 | A1 | 12/2017 | Hasegawa et al. | |

* cited by examiner

*Primary Examiner* — Jae U Yu
(74) *Attorney, Agent, or Firm* — Zilka-Kotab, P.C.

(57) ABSTRACT

A computer-implemented method for managing a first storage library and a second storage library, according to one embodiment, includes associating a first physical tape and a second physical tape with a logical tape. The associating includes writing a first identifier to an index of the logical tape. The first identifier represents the first physical tape and the first storage library. The associating further includes writing a second identifier to the index of the logical tape. The second identifier represents the second physical tape and the second storage library. The computer-implemented method further includes storing the index of the logical tape in memory, and displaying the logical tape by reading the index from memory as a file system.

17 Claims, 13 Drawing Sheets

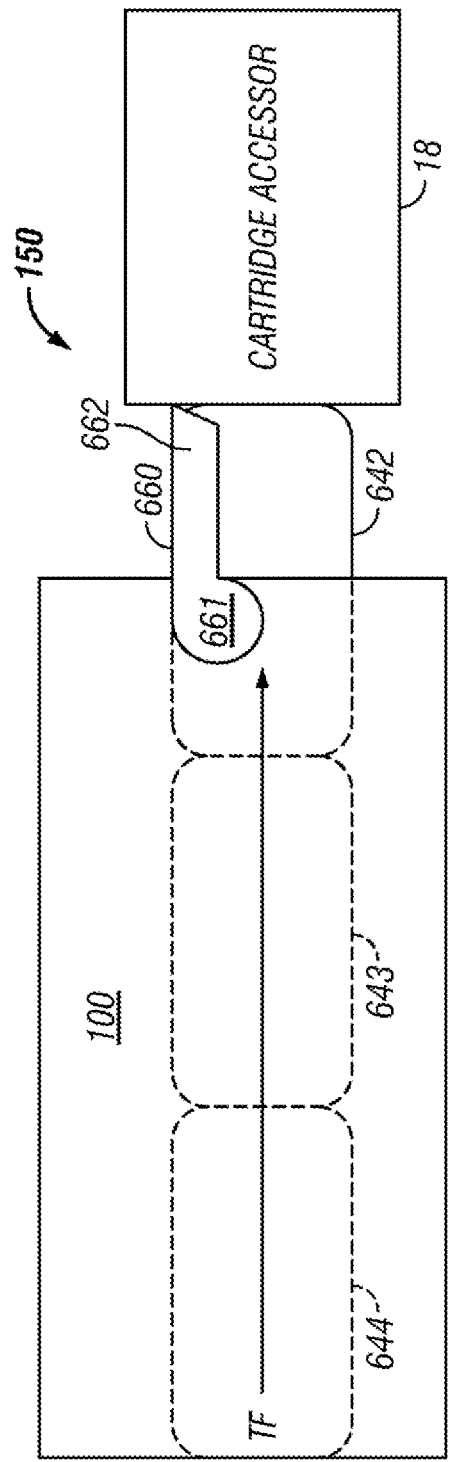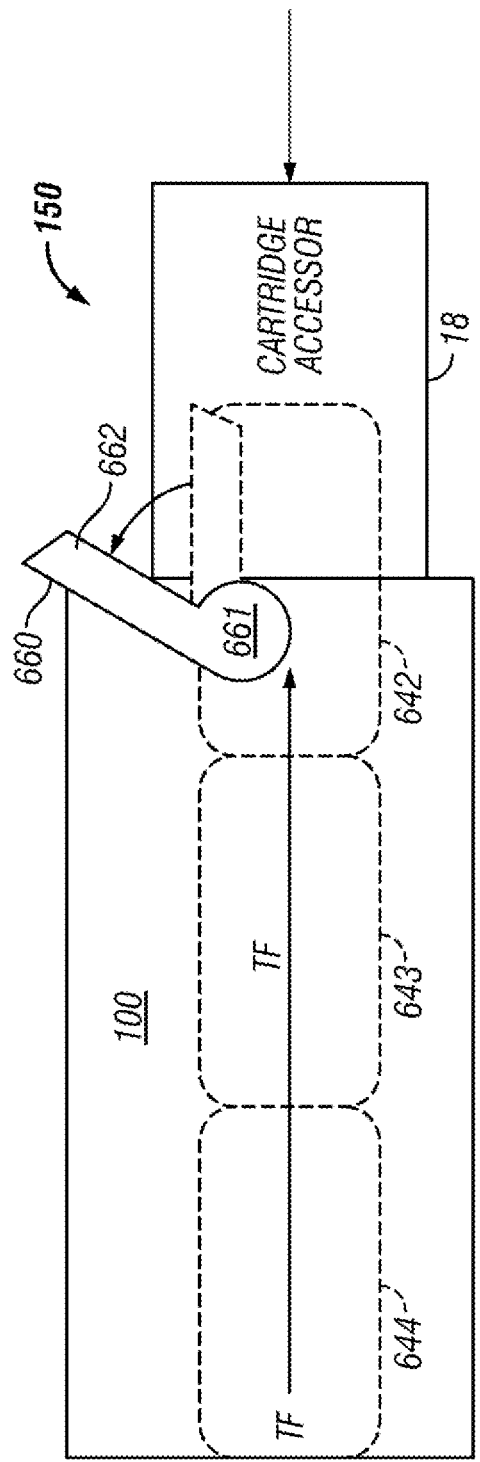

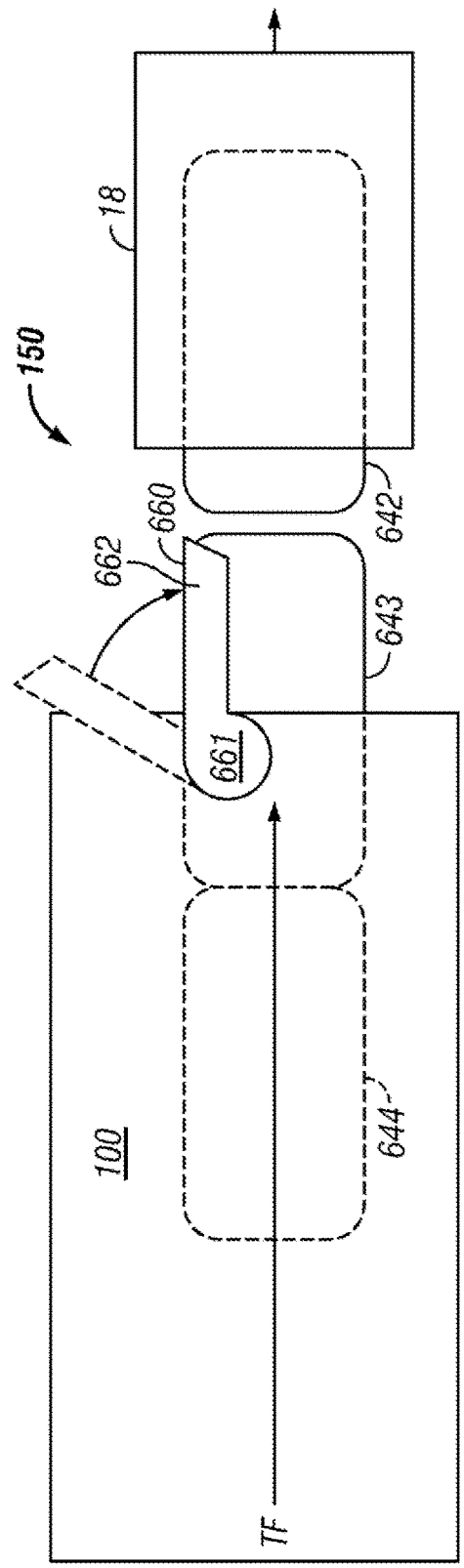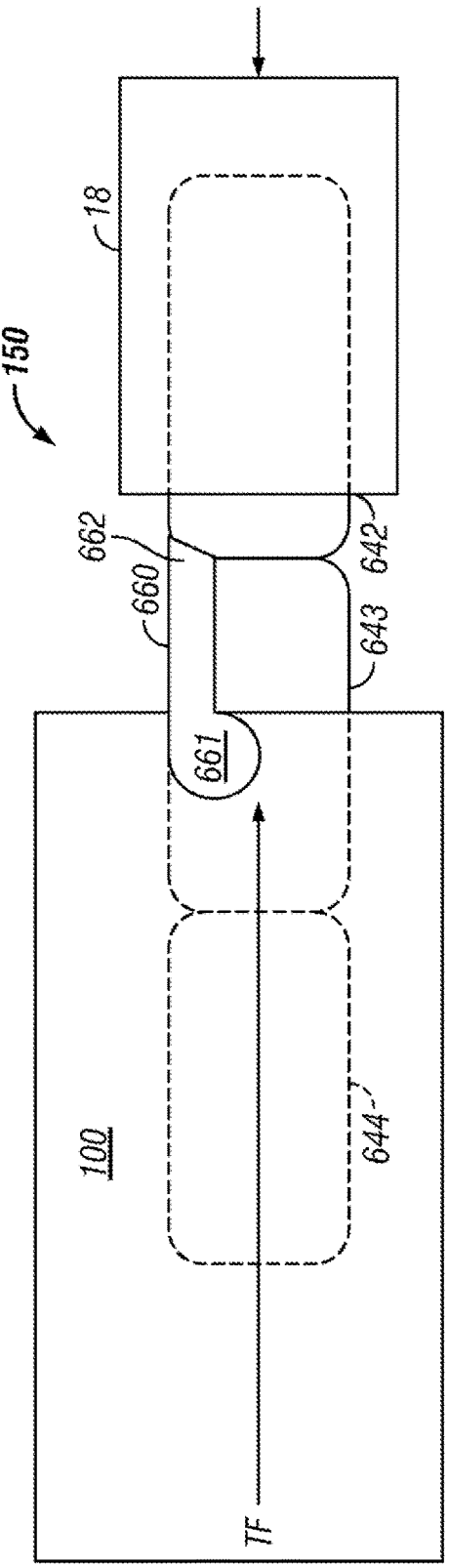
FIG. 8C
FIG. 8D

1100

Example: Preface part of an LTFS index file
<?xml version="1.0" encoding="UTF-8"?>
<ltfsindex version="2.3.0">
<creator>IBM LTFS 1.2.0 - Linux - ltfs</creator>
<volumeuuid>30a91a08-daae-48d1-ae75-69804e61d2ea</volumeuuid>
<generationnumber>3</generationnumber>
<comment>A sample LTFS Index</comment>
<updatetime>2013-01-28T19:39:57.245954278Z</updatetime>
<volumelockstate>unlocked</volumelockstate>
<associatedtapes>
<associatedtape>
<tape>PHY000L7</tape>
<library>0000LB123456_L00</library>
</associatedtape>
<associatedtape>
<tape>PHY100L7</tape>
<library>0000LB987654_L00</library>
</associatedtape>
</associatedtapes>
<directory>
...
</directory>
</ltfsindex>

Example: FILE portion of a LTFS index file
<file>
<fileuid>4</fileuid>
<name>testfile.txt</name>
<creationtime>2013-01-28T19:39:51.744583047Z</creationtime>
<changetime>2013-01-28T19:39:57.245291730Z</changetime>
<modifytime>2013-01-28T19:39:57.245291730Z</modifytime>
<accesstime>2013-01-28T19:39:57.240774456Z</accesstime>
<backuptime>2013-01-29T20:21:45.424385077Z</backuptime>
<readonly>true</readonly>
<extendedattributes>
</extendedattributes>
<associatedtapes>
<associatedtape>
<tape>PHY000L7</tape>
<library>0000LB123456_L00</library>
</associatedtape>
</associatedtapes>
</file>

FIG. 12

MANAGEMENT OF A MULTI-LIBRARY STORAGE SYSTEM

BACKGROUND

The present invention relates to data storage systems, and more particularly, this invention relates to management of data within a plurality of storage libraries.

Automated data storage libraries are known for providing cost effective storage and retrieval of large quantities of data. The data in automated data storage libraries is typically stored on media of data storage cartridges that are, in turn, stored at storage slots or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or discs), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage slots, data storage drives, and I/O stations is typically accomplished by one or more accessors. Such accessors have grippers for physically retrieving the selected data storage cartridges from the storage slots within the automated data storage library and transporting such cartridges to the data storage drives by moving, for example, in the horizontal (X) and vertical (Y) directions.

Automated data storage libraries implement magnetic tape for storage range from small scale to large scale systems. One specific type of system, a linear tape file system (LTFS), is a file system that can be used on tape storage. LTFS offers versions of Library Edition (hereinafter referred to as LE) for a single library, and Enterprise Edition (hereinafter referred to as EE) which may be applicable to larger storage systems.

In such systems, tape storage is often suitable for archiving, because tape storage offers a low capacity unit cost and high recording density.

SUMMARY

A computer-implemented method for managing a first storage library and a second storage library, according to one embodiment, includes associating a first physical tape and a second physical tape with a logical tape. The associating includes writing a first identifier to an index of the logical tape. The first identifier represents the first physical tape and the first storage library. The associating further includes writing a second identifier to the index of the logical tape. The second identifier represents the second physical tape and the second storage library. The computer-implemented method further includes storing the index of the logical tape in memory, and displaying the logical tape by reading the index from memory as a file system.

A computer program product for managing a first storage library and a second storage library, according to one embodiment, includes a computer readable storage medium having program instructions embodied therewith. The computer readable storage medium is not a transitory signal per se. The program instructions are readable and/or executable by a controller to cause the controller to perform the foregoing method.

An apparatus according to one embodiment includes a processor, and logic configured to cause the processor of the apparatus to associate, by the processor, a first physical tape and a second physical tape with a logical tape. The associating includes writing a first identifier to an index of the logical tape. The first identifier represents the first physical tape and a first storage library. The associating further includes writing a second identifier to the index of the logical tape. The second identifier represents the second physical tape and a second storage library. The logic is further configured to cause the processor of the apparatus to store, by the processor, the index of the logical tape in memory. The logic is further configured to cause the processor of the apparatus to display, by the processor, the logical tape by reading the index from memory as a file system.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIGS. 8A-8D are partial side views of a cartridge blocking mechanism according to one embodiment.

FIG. 11 is a portion of an index file in accordance with one embodiment.

FIG. 12 is a portion of an index file in accordance with one embodiment.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of storage systems, as well as operation and/or component parts thereof.

In one general embodiment, a computer-implemented method for managing a first storage library and a second storage library includes associating a first physical tape and a second physical tape with a logical tape. The associating includes writing a first identifier to an index of the logical tape. The first identifier represents the first physical tape and the first storage library. The associating further includes writing a second identifier to the index of the logical tape. The second identifier represents the second physical tape and the second storage library. The computer-implemented method further includes storing the index of the logical tape in memory, and displaying the logical tape by reading the index from memory as a file system.

In another general embodiment, a computer program product for managing a first storage library and a second storage library includes a computer readable storage medium having program instructions embodied therewith. The computer readable storage medium is not a transitory signal per se. The program instructions are readable and/or executable by a controller to cause the controller to perform the foregoing method.

In another general embodiment, an apparatus includes a processor, and logic configured to cause the processor of the apparatus to associate, by the processor, a first physical tape and a second physical tape with a logical tape. The associating includes writing a first identifier to an index of the logical tape. The first identifier represents the first physical tape and a first storage library. The associating further includes writing a second identifier to the index of the logical tape. The second identifier represents the second physical tape and a second storage library. The logic is further configured to cause the processor of the apparatus to store, by the processor, the index of the logical tape in memory. The logic is further configured to cause the processor of the apparatus to display, by the processor, the logical tape by reading the index from memory as a file system.

Figure 1:
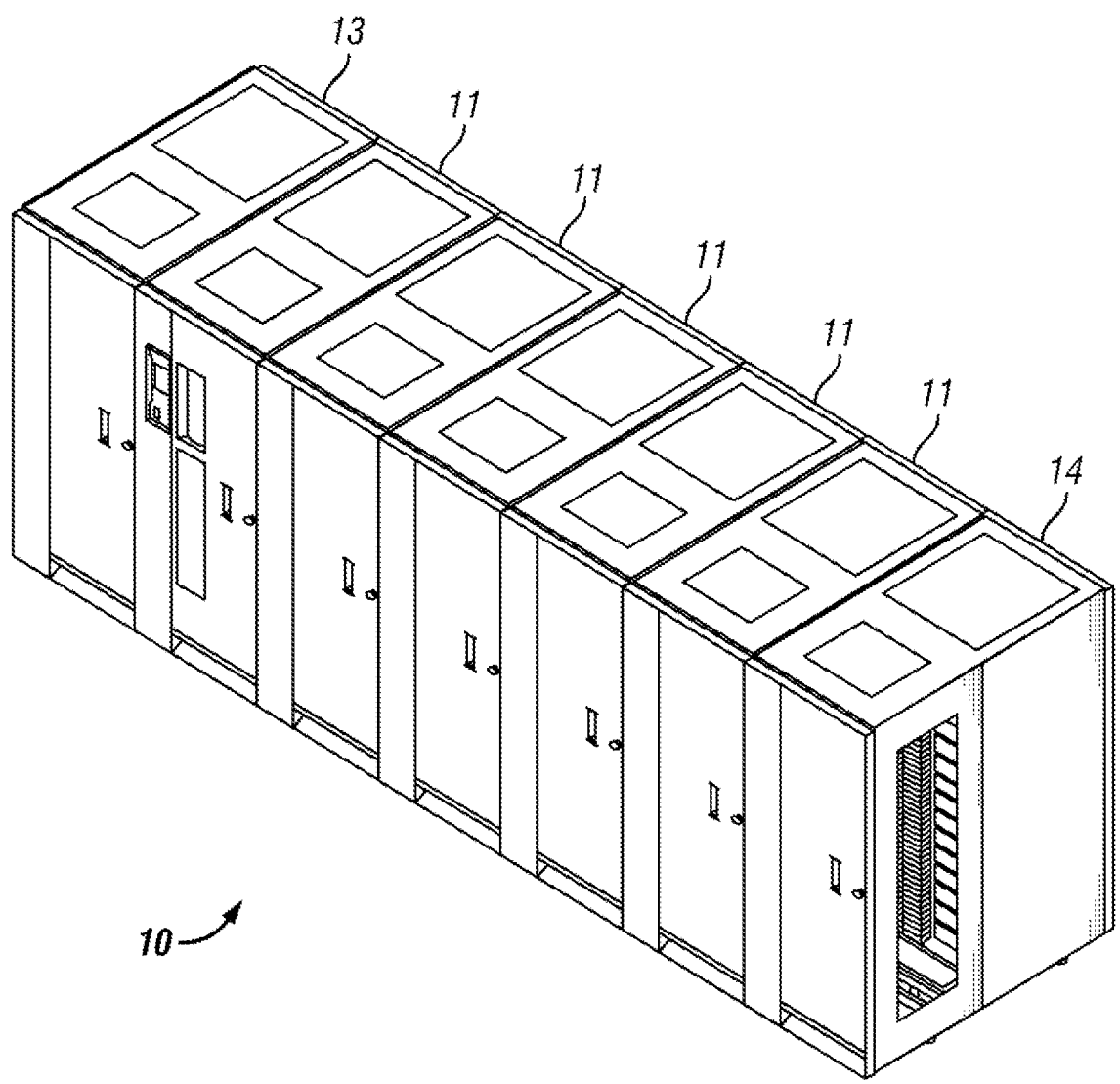
FIG. 1 is a perspective view of an automated data storage library according to one embodiment.
Figure 2:
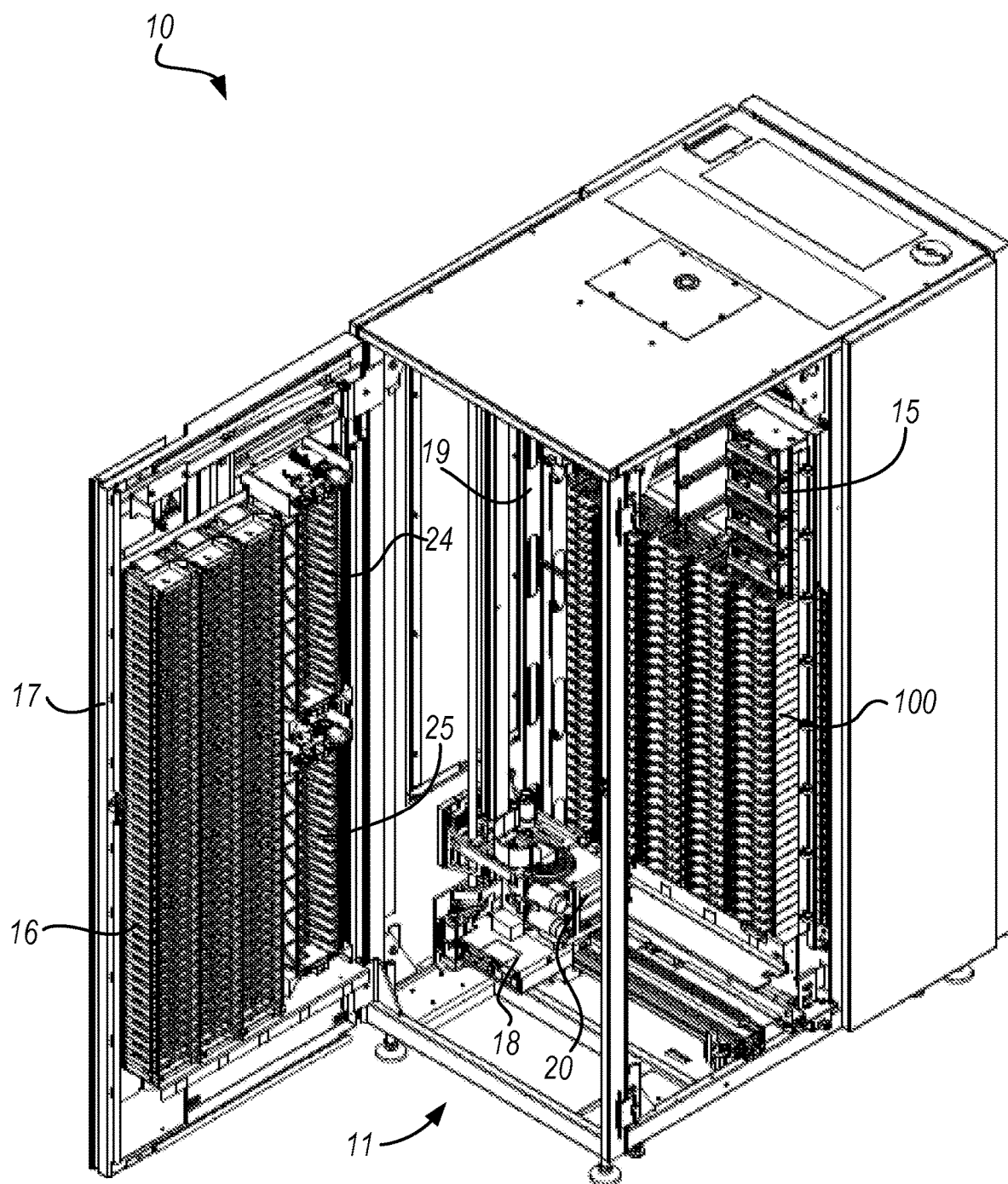
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage slots 16. An example of an automated data storage library which has a similar configuration as that depicted in FIGS. 1-2, and may be implemented with some of the various approaches herein is the IBM 3584 UltraScalable Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage slots, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage slots 16 on front wall 17 and a plurality of multi-cartridge deep slot cells 100 on rear wall 19, both of which may be used for storing data storage cartridges that may contain data storage media. According to one approach, the storage slots 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage slots 16, the multi-cartridge deep slot cells, and/or the data storage drive(s) 15. According to various approaches, the data storage drives 15 may be optical disc drives, magnetic tape drives, solid state drives having non-volatile random access memory (NVRAM) such as Flash memory, or other types of data storage drives as are used to read and/or write data with respect to the data storage media.

As illustrated, the storage frame 11 may optionally include an operator panel or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage slots 16, preferably accessible by the first accessor 18.

As described above, the storage frames 11 may be configured with different components depending upon the intended function. One configuration of storage frame 11 may comprise storage slots 16 and/or multi-cartridge deep slot cells 100, data storage drive(s) 15, and other optional components to store and retrieve data from the data storage cartridges. However, in another approach, a storage frame 11 may include storage slots 16 and/or multi-cartridge deep slot cells 100 and no other components. The first accessor 18 may have a gripper assembly 20, e.g., for gripping one or more data storage media, in addition to having a bar code scanner or other reading system, such as a cartridge memory reader or similar system mounted on the gripper assembly 20, to "read" identifying information about the data storage media.

Figure 3:
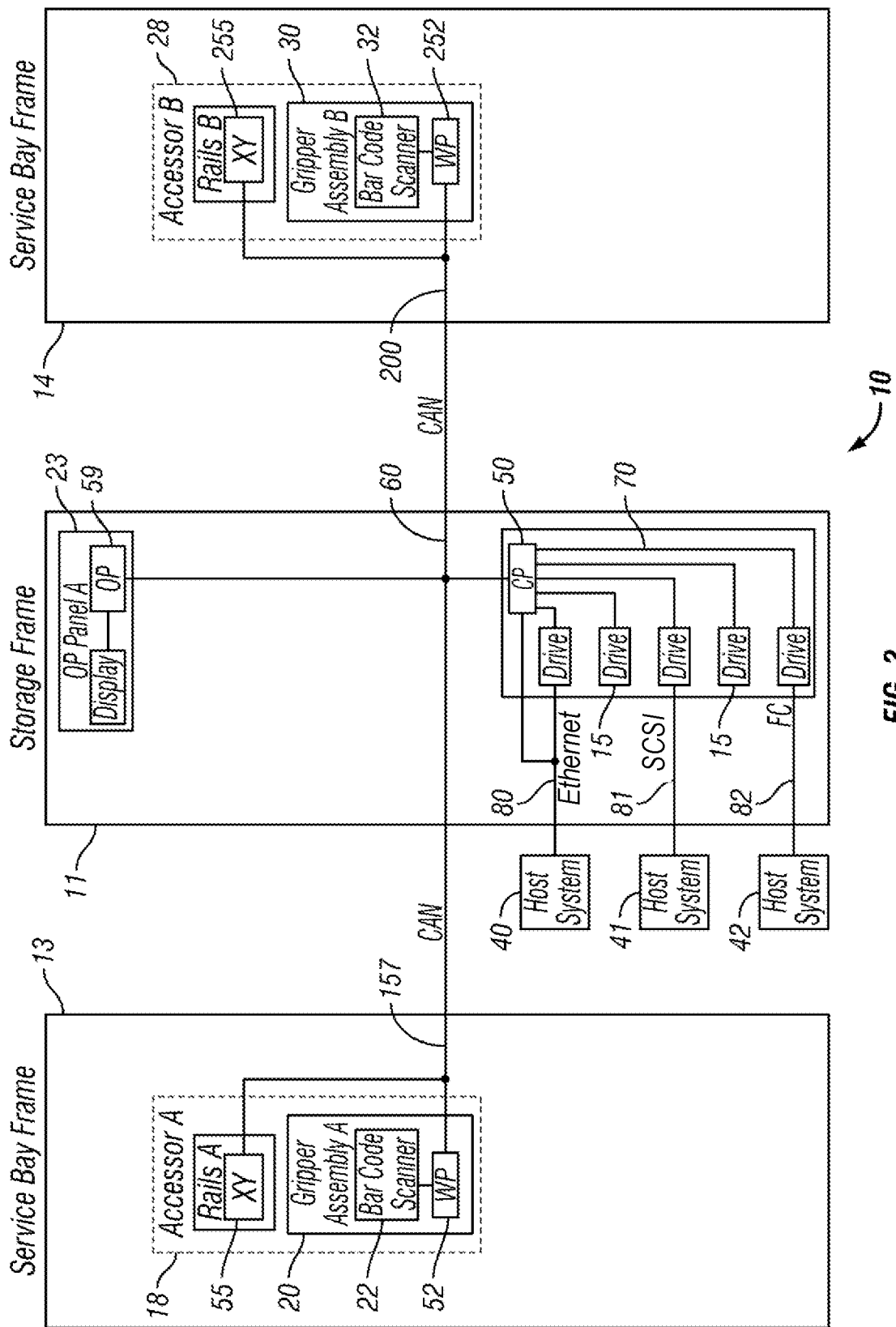
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations.

Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a bar code scanner (e.g., reading system) to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus, in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage slots 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage slots 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be Ethernet and a SCSI bus, respectively, e.g., and may serve as host connections. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as Ethernet, or a serial connection, such as RS-422. Thus, the data storage drives 15 may be individually coupled to the communication processor node 50 by lines 70. Alternatively, the data storage drives 15 may be coupled to the communication processor node 50 through one or more networks.

Furthermore, additional storage frames 11 may be provided, whereby each is preferably coupled to the adjacent storage frame. According to various approaches, any of the additional storage frames 11 may include communication processor nodes 50, storage slots 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover, the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
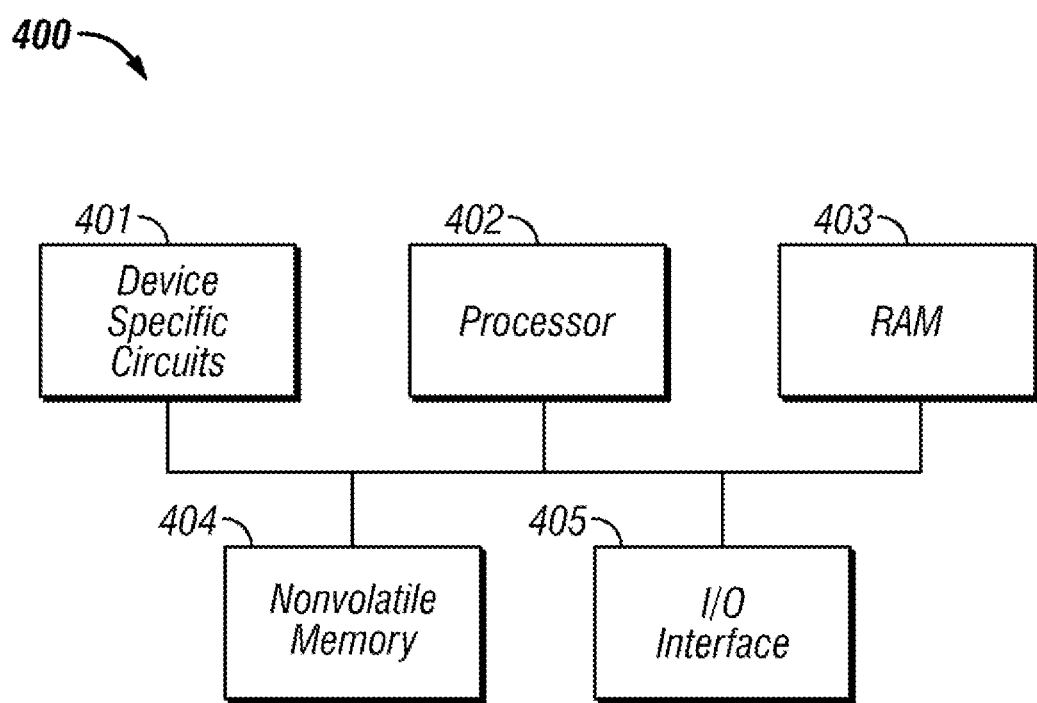
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
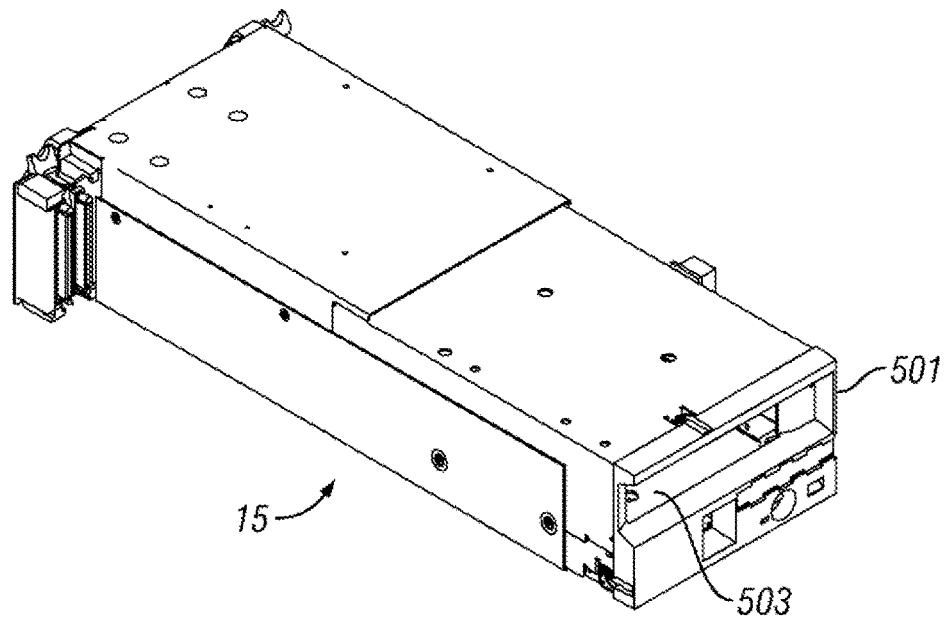
FIG. 5A is a front perspective view of a data storage drive according to one embodiment.
Figure 5B:
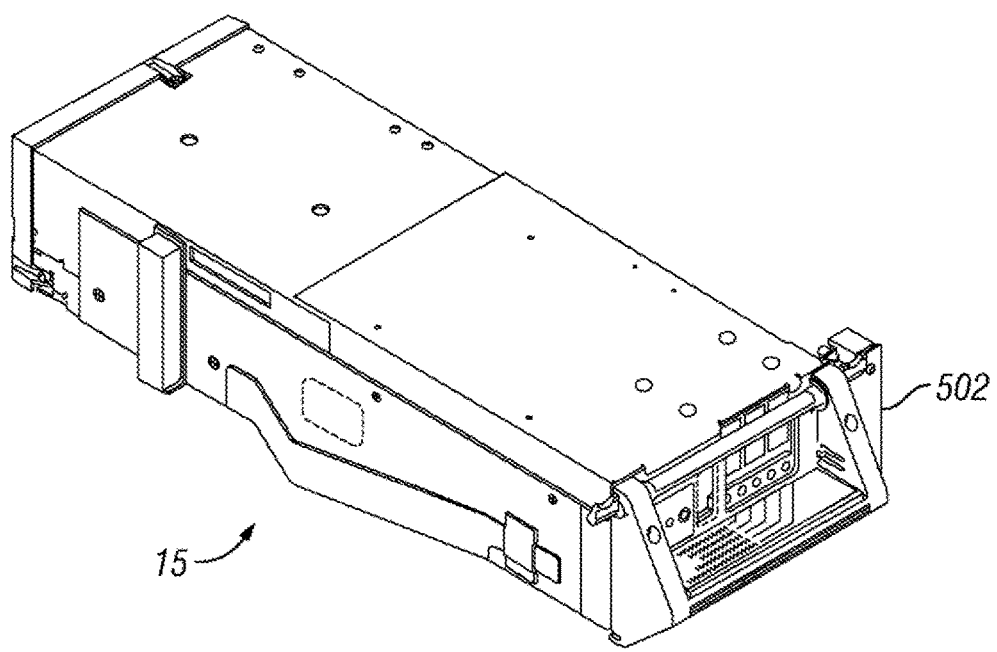
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
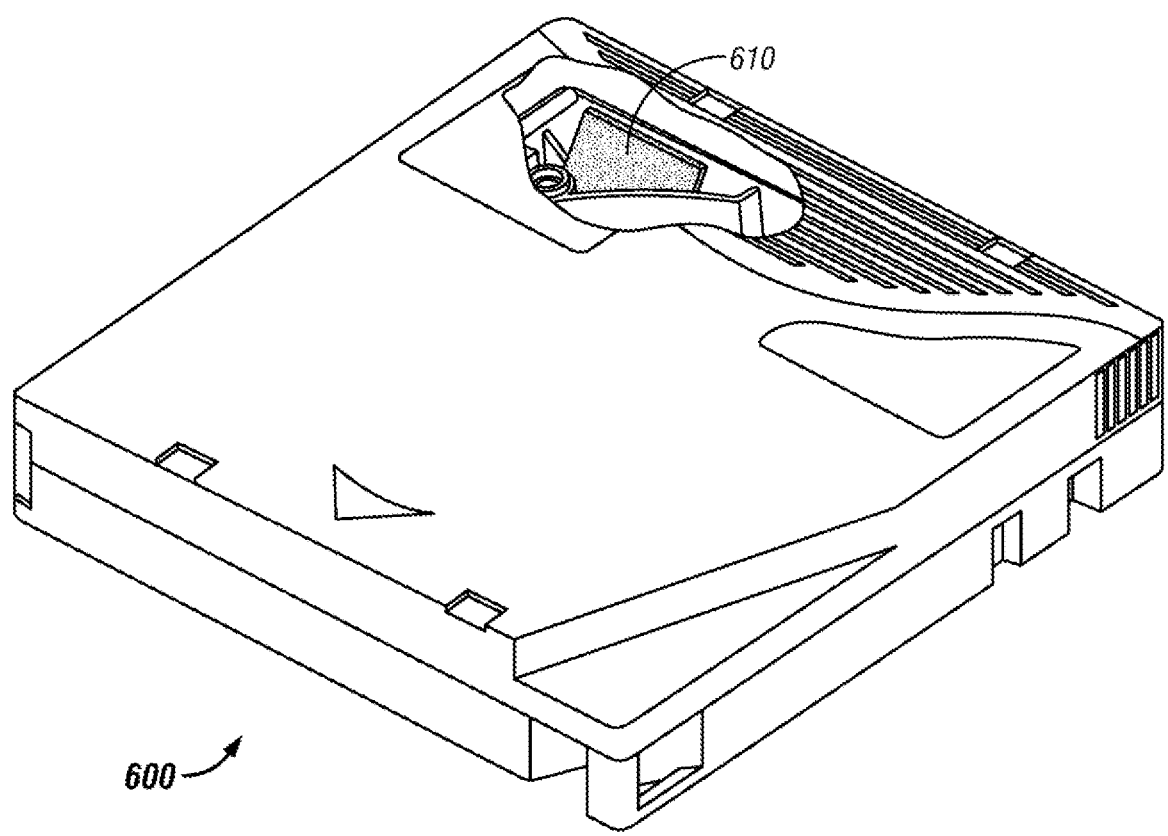
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, discs, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
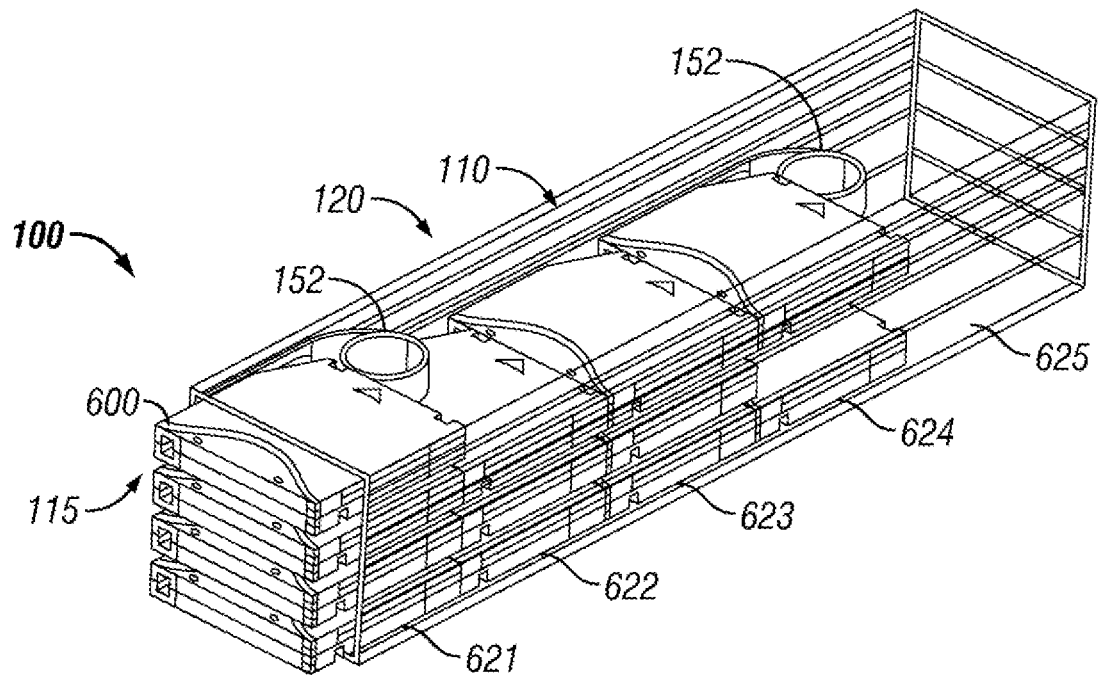
FIGS. 7A-7B are perspective views of a multi-cartridge deep slot cell according to one embodiment.
Figure 7B:
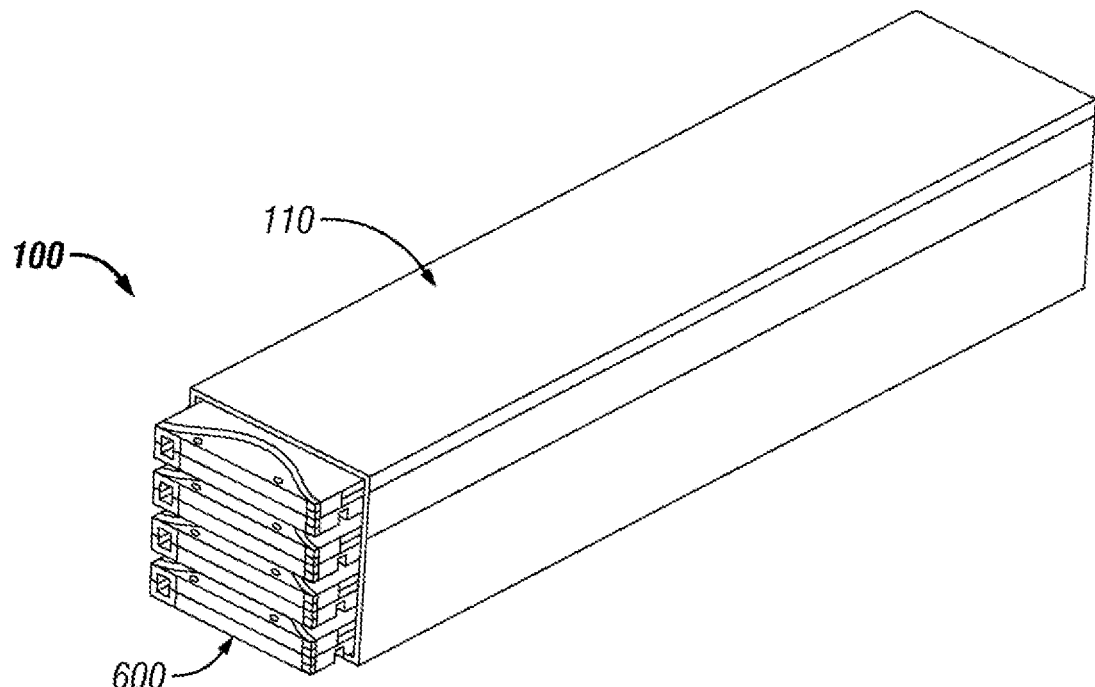

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage slots 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage slot may include the ability to remove a cartridge from a storage slot, the ability to place a cartridge into a storage slot, or combinations thereof.

According to an exemplary embodiment, the storage slots from top to bottom are considered to be in parallel and comprise the same tier. Moreover, the storage slots from front to back, in a particular row, are considered to be in series and comprise sequential tiers.

Referring back to FIGS. 7A-7B, in accordance with one embodiment, storage slots 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage slots 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage slots 16, and/or transport inserted or added cartridge(s) to specific single cartridge storage slots 16.

Figure 9:
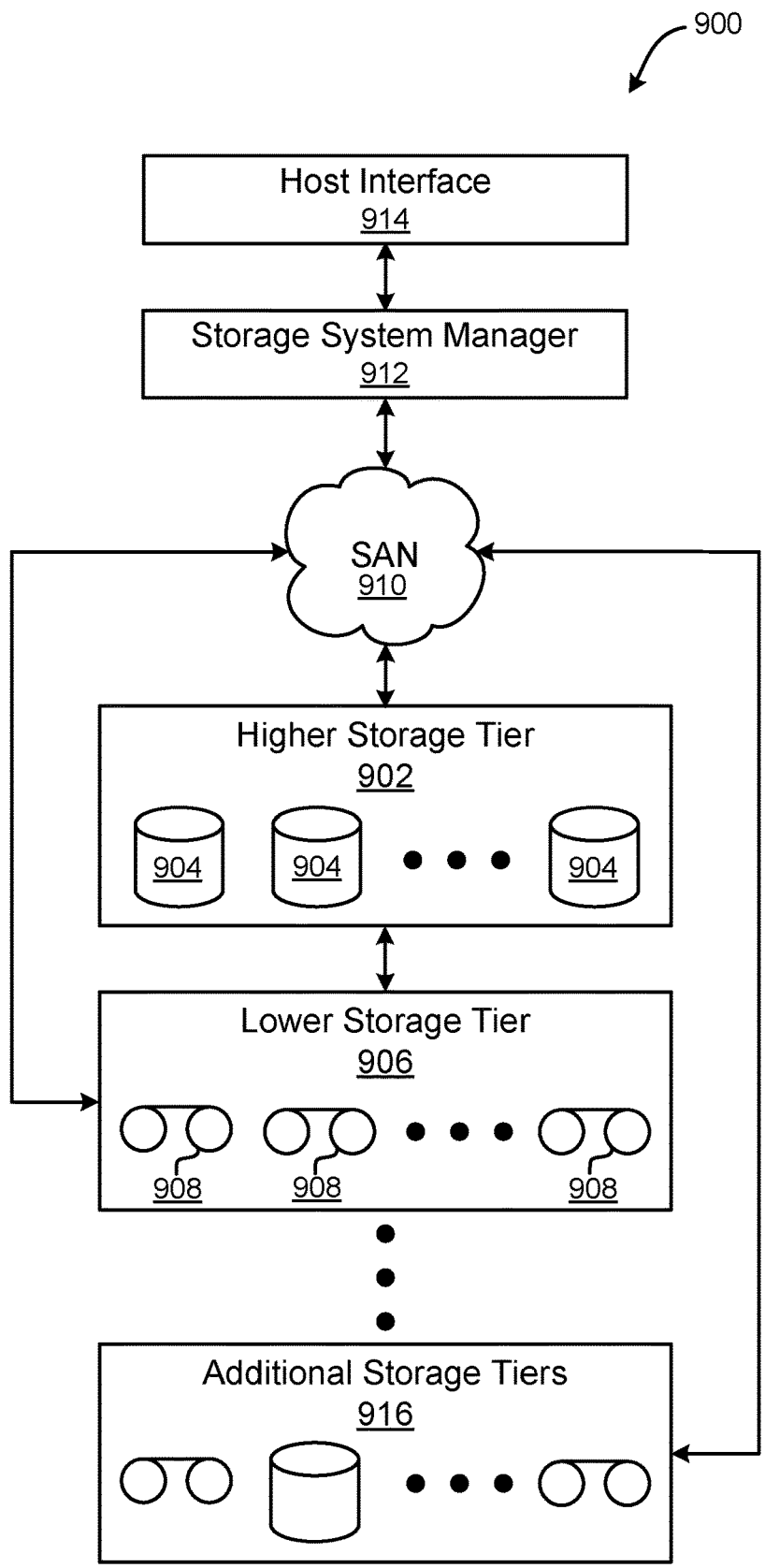
FIG. 9 is a depiction of a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

Despite tape storage providing a low capacity unit cost and high recording density storage option, some users opt for cloud storage for archiving data rather than local tape-based storage systems. One of the reasons for this is perhaps because cloud storage enables starting-up so called "small start."

Large scale tape storage sometimes has an associated large start-up cost. In view of this, a "scale-up" approach is sometimes implemented. In a scale up approach, a system begins with a small library, and subsequently replaces the small library with a larger library when the library's collective amount of data approaches a storage capacity of the library.

Another approach is sometimes referred to as a "scale-out" approach, in which the size of an initial library is increased in a step-by-step manner as data requirements of the library increase. Further descriptions of this scale-out approach will now be provided below in the context of using LE or EE.

In LE, each of the tape cartridges in a library are presented as a subdirectory under the mount point of an LTFS, in the perspective of the file system. Thus, a user can positively instruct which cartridge is to be used for writing and/or reading a file, or confirm which cartridge has previously been used for writing or reading a file. LE offers an advantage of enabling a user to specify a tape as the path name of a file (of data) when selecting the tape from an external application using LE. However, LE systems are executed on a single server for a single library connected to the server, and LE systems are not applicable for the scale-out approach.

It is possible to use a plurality of libraries on a plurality of LE systems at the same time. However, in this case, for each of the libraries, an LE system is activated on a server to which the library is connected, and the library is connected to a mount point on the same server. As a result, to specify a file, the server name and the path name may need to be specified.

In addition, because a single LE system is installed for each of the plurality of paralleled libraries, when access concentration occurs on a tape managed under an LE system, a drive of the corresponding library may only be used. This is even despite other drives of other libraries potentially not being in use. Accordingly, some advantages of the scale-out approach and/or components associated therewith may remain not fully utilized.

It should be noted that here, it is assumed that a set of a library and a server executing an LE system are to be added when scaling-out the system. Executing two or more LE systems on the same server is possible, but it is not preferred in the perspective of scale-out because of the load incurred on the server. In addition, because LE systems may call for different respective mount points when a plurality of LE systems are executed on the same server, a path name may need to be modified according to the library in which the corresponding tape exists. Thus, it is still not feasible and/or possible to continue to use the same path name as was used before scaling-out the system.

To further elaborate the effects of scaling-out a system, a scheme of defining logical tape cartridges and assigning a plurality of physical tape cartridges to one logical tape cartridge will now be considered. This scheme may hereafter be referred to as a Multi-Tape File System (MTFS).

An MTFS may operate as an upper layer of a plurality of LE systems, and provide users with a file system that presents logical tape cartridges as folders. A commonly considered method of MTFS includes storing a table containing information of logical tapes, physical tapes, and the libraries (servers) that manage the physical tapes in the MTFS, and, upon receiving a request, e.g., from a user, retrieving the names of the server and the physical tape cartridge corresponding to the request.

Referring now to EE applications, EE is typically used in larger systems, and supports configurations of multiple libraries. However, an EE system is a hierarchical storage management (HSM) system which works with a distributed file system. Although it is capable of writing data to and reading data from a tape library system, it operates under the management of the HSM system. Accordingly, EE systems generally do not allow a user to explicitly specify a physical tape for writing data to. In addition, the reading of a data file is also performed generally through a distributed file system by the nature of the HSM. Accordingly, for use cases in which use of an HSM system is appropriate, EE may be an option. However, for the above-described use case, in which an external application controls relationships between files and recording tapes, EE may not be an appropriate choice for use.

In an EE system, the destination for storing a data is often specified as a "tape pool" (corresponding to a set of physical tapes), rather than as single physical tape. Accordingly, when recording a plurality of files of data on a tape pool, the files can be recorded on separate physical tapes belonging to the same tape pool. This feature of EE enables similar advantages of scaling-out by using a plurality of drives (as previously discussed in the descriptions of MTFS). However, accesses to a plurality of files stored on the same physical tape leads to use of only single drive, which is not efficient. In addition, a tape pool cannot be specified across a plurality of libraries, and thus advantages of scale-out, by increasing libraries, cannot be obtained by a single tape pool.

Various embodiments described herein may be utilized for enabling scale-out configuration of a storage system, while maintaining one or more features of subfolders. In particular, such embodiments establish a logical tape to which physical tapes of different storage libraries are associated.

Figure 10A:
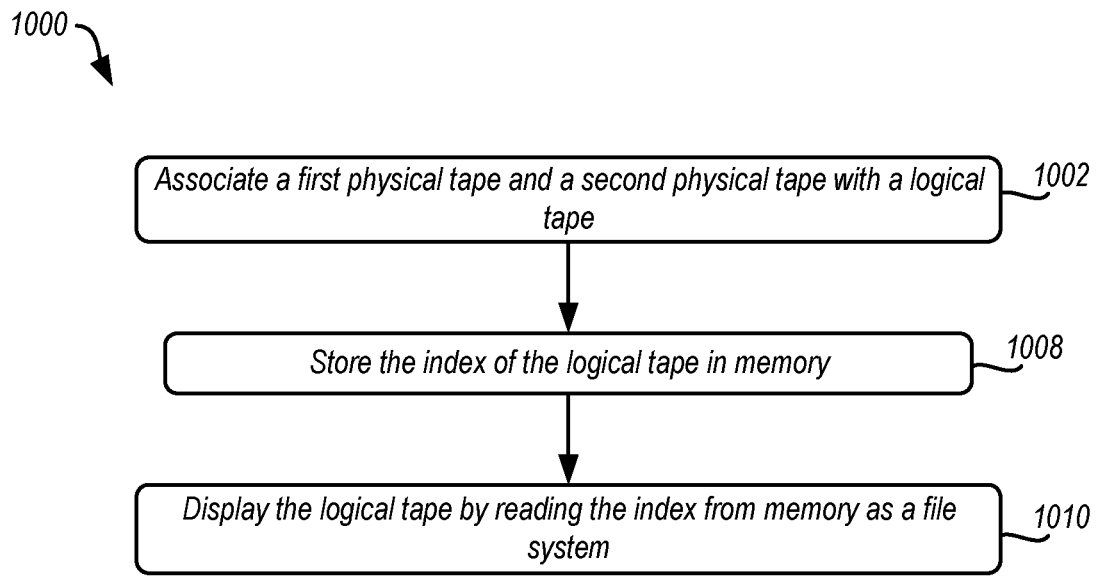
FIG. 10A is a flowchart of a method in accordance with one embodiment.

Now referring to FIG. 10A, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10A may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art.

It should be prefaced that method 1000 may be utilized for managing a first tape storage library and a second tape storage library.

Method 1000 includes associating a first physical tape and a second physical tape with a logical tape, e.g., see operation 1002. According to various approaches, the first physical tape and/or the second physical tape may include any type of physical tape. In a preferred approach, the first physical tape and the second physical tape are magnetic recording tapes.

Figure 10B:
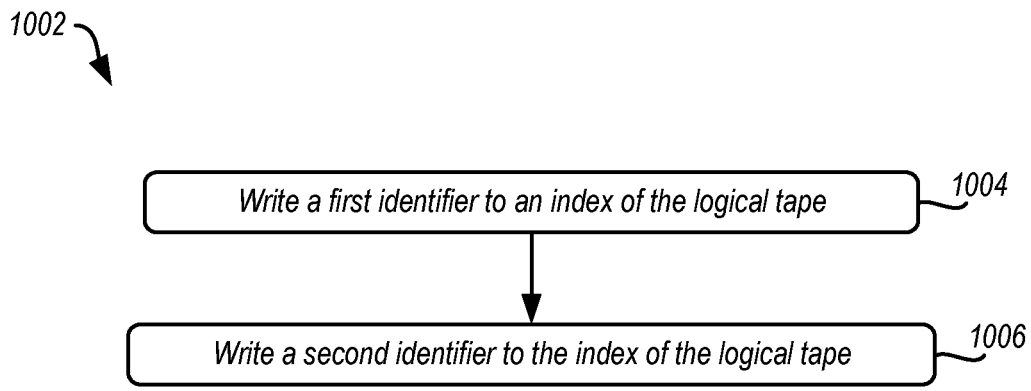
FIG. 10B is a flowchart of sub-operations of an operation of the method flowchart of FIG. 10A.

Looking to FIG. 10B, exemplary sub-operations of associating the first physical tape and the second physical tape with the logical tape (operation 1002) are illustrated in accordance with one approach. One or more of such sub-operations may be used to perform operation 1002 of FIG. 10A, however, such sub-operations are in no way intended to limit descriptions herein.

Sub-operation 1004 includes writing a first identifier to an index of the logical tape. In one approach, the first identifier may represent the first physical tape and the first tape storage library as the location of the first physical tape. Sub-operation 1006 includes writing a second identifier to the index of the logical tape. In one approach, the first identifier may represent the second physical tape and the second tape storage library as the location of the second physical tape. Any type of conventional metadata may be used to create the identifiers.

It should be noted that in some approaches, a user may control, e.g., assign, which physical tapes are to be associated with the logical tape. In one specific approach, a user's assignment of which tapes are to be assigned to the logical tape may be received prior to an export operation, e.g., where at least some distributed data of a storage system is migrated to a single physical tape.

Referring again to FIG. 10A, method 1000 includes storing the index of the logical tape in memory, e.g., see operation 1008. According to various approaches, the memory may include any type of memory. For example, in one approach, the type of memory in which the index of the logical tape is stored may be different than the type of memory in which the logical tape is represented/stored.

In operation 1010, the logical tape is displayed by reading the index from memory as a file system. In one approach, the file system may be displayed on an output interface for a user, where the logical tape is presented to a user as a subfolder. For example, assuming that the mount point is /mnt/mtfs, /mnt/mtfs/USR001L7 is presented to users as the subfolder, where USR001L7 is the logical tape identifier.

Various optional reading and/or writing operations that may be included in method 1000 will now be described.

For example, in various approaches, method 1000 may include one or more operations for fulfilling a request to write data. In one of such approaches, in response to receiving the request to write data, method 1000 includes identifying both the first physical tape and the second physical tape as a destination to which the data is to be written. In another of such approaches, in response to receiving the request to read data, method 1000 includes identifying both the first physical tape and the second physical tape as a destination from which the data is to be read.

Accordingly, in one approach, the data is written on both the first physical tape and the second physical tape. In preferred approaches, the data written on both the first physical tape and the second physical tape may be duplicates. As will be described elsewhere herein, as a result of writing the data on both the first physical tape and the second physical tape, either of such tapes may be used for subsequently accessing the data.

It should be noted that the data may be immediately written on both the first physical tape and the second physical tape, or a writing of the data may be scheduled for a later time, e.g., after a current writing event is completed.

The index of the logical tape may be updated to reflect information about the written data. For example, according to various approaches, the index of the logical tape may be updated to reflect typical index information, e.g., a location of the data on the first physical tape, a location of the data on the second physical tape, file size, etc.

As previously mentioned elsewhere herein, in one approach, in response to any processing being performed, e.g., the writing of the data, the naming of the file, etc., the index file of the logical tape may be updated.

Moreover, in some approaches, managing the first storage library and the second storage library includes deleting data from the first physical tape and/or the second physical tape that is accessed less than a predetermined amount, e.g., thereby considered stale/cold data. Accordingly, in one approach, a frequency of accesses to data is determined. The data may include any data that is stored on the first physical tape and/or the second physical tape.

A frequency of accesses to the data may be determined using any one or more known methods, such as an auditing of an access history of the data, accessing a count that is added to each time that the data is accessed, receiving an indication of the frequency of accesses to the data, etc.

In one approach, the determined frequency is compared to a predetermined threshold. The predetermined threshold may be dynamically adjusted at any time, e.g., in response to determining an overall performance in the first storage library and/or overall performance in the second storage library decreases, in response to determining an overall performance in the first storage library and/or overall performance in the second storage library increases, in response to determining that the storage capacity of the first storage library and/or the second storage library changes, etc.

In response to determining that the determined frequency is less than or equal to the predetermined threshold, in one approach, an instruction may be sent to reformat one of the identified physical tapes for deleting the data from at least one of the reformatted physical tapes. According to various approaches, a reformatting of one of the identified physical tapes may include, e.g., reformatting some or all of the tape, deleting a pointer to the data on one of the physical tapes from the index of the logical tape, performing garbage collection, etc.

However, in another approach, in response to determining that the determined frequency is greater than the predetermined threshold, an optional operation of method 1000 includes instructing the data to be written to a cache and/or to another physical tape of a library reserved for data having a relatively high access frequency. For example, in one approach, in response to determining that the determined frequency is greater than the predetermined threshold, method 1000 includes instructing the data to be written to a third physical tape in a third storage library. Moreover, in such an approach, the third physical tape may be associated with the logical tape. For example, a third identifier may be written to the index of the logical tape, e.g., where the third identifier represents the third physical tape and the third storage library. In one approach, the index of the logical tape is updated to reflect the written data.

Writing the data to one or more of such locations may enable a quicker read-back of the data than would otherwise be available in reading the data from the physical tape having the data. Depending on the approach, in response to writing the data to such a location, a reformatting instruction for for deleting the data from at least one of the physical tapes may be sent. Deleting the data may free-up storage space on the reformatted physical tape, e.g., for subsequent data writing operations.

In another approach, the data may be left alone on the physical tapes in response to determining that the determined frequency is greater than the predetermined threshold.

In response to receiving a request for data that was previously written on one or both the first physical tape and the second physical tape, the index of the logical tape is read for identifying the location of the data. Using the index, the first physical tape and the second physical tape are identified as storage on which the data is stored. Moreover, with the location of the data identified, one of the identified physical tapes may be selected as a source tape from which the data is to be read.

Of course, a read request for other data may additionally and/or alternatively be received. For example, assume a request is received for data that is not stored on the first physical tape and that is not stored on the second physical tape, but is stored on a third physical tape and a fourth physical tape (that reside in the first storage library and the second storage library respectively). In such an approach, the index of the logical tape may be read, and location identifiers for the third and fourth physical tapes are found in the index as being associated with the request data. Accordingly, the physical tapes on which the data is stored are identified. In one approach, one of the identified physical tapes is selected as a source tape from which the data is to be read. The read request is sent to the server and/or library associated with the selected physical tape with the identification information of the data to be retrieved and physical tape having the data thereon.

It should be noted that the processing of read operations of various approaches and/or embodiments described herein is configured to promptly fulfill read requests for data as a result of data being duplicated on a plurality of physical tapes, thereby increasing accessibility to the data. Accordingly, because the data may be stored on multiple physical tapes, and one of the tapes is typically more readily accessible than the other, the physical tape estimated to provide fastest relative read-back time may be selected to serve the read request.

Selection of one of multiple tapes having a copy of requested data as the source tape may consider any one or more variables, as will now be described below.

In one approach, selection of the source tape includes determining a time to perform a read-back of the data for each of the physical tapes identified as having a copy of the data thereon. In such an approach, the physical tape having a shortest of the read-back times may be selected as the source tape.

In some other approaches, the selection of a source tape may include maintaining and considering a priority scoring of the identified physical tapes. For example, one approach includes assigning a priority score to each of the identified physical tapes based on an associated use of each of the identified physical tapes. An illustrative approach for such assigned scoring will now be described according to various approaches.

In one approach, a physical tape that is mounted on a drive and is not currently being used is assigned a higher priority score than a physical tape that is not mounted on a drive and is not currently being used, e.g., for a read operation, for a write operation, being burnished, etc. Moreover, in one approach, a physical tape that is not mounted on a drive and is not currently being used for some process is assigned a higher priority score than a physical tape that is mounted on a drive and is currently being used for some process. Furthermore, a physical tape that is mounted on a drive and currently being used for some process may be assigned a higher priority score than a physical tape that has been moved outside of a library.

Accordingly, in one approach, an assigned priority score may be determined for each of the identified physical tapes. The physical tape having a highest of the priority scores may be selected as the selected source tape.

In contrast, in other approaches, the priority scoring may alternatively include assigning the above mentioned physical tapes an opposite ordering as that described above, e.g., "lower" priority score instead of "higher" priority score. In such approaches, a physical tape having a lowest of the priority score may be selected as the source tape.

In some approaches, read operations may include reading data from a plurality of different physical tapes concurrently. For example, a first part of the data may be read from the first physical tape, and a remaining part of the data may be read from the second physical tape. In approaches where this practice is applied to all data read events and all data write events, the effective storage capacity of the system may be reduced to half of the total capacity that the system would otherwise have if data was stored only a single time within the system. However, there are numerous benefits to implementing this scheme of splitting data read operations across multiple physical source tapes. For example, such a scheme may offer improved reliability and accessibility of the data. In contrast, because of duplicate instances of data, the trade-off is a reduction of overall storage capacity of the system, e.g., making one duplicate per data file reduces a system's potential storage capacity in half. Thus, an optimum number of duplicates may be determined according to the use case of the system.

For example, to improve the accessibility and the reliability of data, data is preferably stored in a plurality of tape cartridges to maintain redundancy of data. Further, libraries may be installed at remote sites so as to prevent data loss in the event of disasters. Meanwhile, when considering the capacity of the system that includes such libraries, the number of physical tapes storing duplicate data may be regulated in accordance with the frequency of accesses to such physical tapes and/or the data. For example, for data that has not been access in a certain period of time, one duplicate of the data may be deleted from one of the physical tapes that include a copy of the data thereon, thereby freeing up capacity for other data. Accordingly, a balance between capacity and accessibility is established.

It should be noted that in some approaches, one or more known algorithms may be used when selecting a physical tape for deletion of data. In one approach, such algorithm(s) are used in selecting a physical tape on which the data is to be deleted, so that as many files as possible are aggregated in one tape, or, on the contrary, files are distributed over as many different physical tapes as possible. It should also be noted that due to the nature of physical tape storage being a sequential write medium, management of the number of physical tapes that contain a copy of data may include an operation called "re-claim," which copies only valid data to other mediums, for the purposes of freeing up storage space on a physical tape.

Scheme of Making an Association Between Logical Tape Cartridge and Physical Tape Cartridge of MTFS Various examples of associating the first physical tape and the second physical tape with the logical tape within a MTFS will now be described in greater detail.

The MTFS may be implemented by making the modifications described below to an LE based system. Accordingly, description is given of an exemplary approach in which a LE system is used as a lower layer LE system. However, the lower LE system may be modified to enable lower level communication, such as per-block communication, between the MTFS and the LE system. Of course, the present descriptions are not intended to limit the method for communication between the MTFS and the LE system.

An index file is extended so as to enable storing a plurality of sets of associated "library name(s)" and "physical tape name(s)". For example, a format such as that found in the portions of the index file 1100 of FIG. 11 may be used for prefacing a portion of an LTFS index file in accordance with IBM LTFS.

An "<extent>" portion of the index file is represented by replacing the portions of the index file with "<associated_tape>", e.g., see portions of index file 1200 of FIG. 12.

The "extended" index file is created per logical tape, and may be stored on, e.g., a server on which the MTFS is operating, a device such as a computer on which method 1000 is being performed, a server that is being managed, etc.

When access to a file is requested, the MTFS refers to those added entries, and forwards the request to the corresponding lower LE system.

The request is made with a path name to the file, in which path name a logical tape cartridge name is inserted. The logical tape cartridge name inserted in the path name is the name of the directory located under the mount point of the lower LTFS and having that cartridge name.

Example 1

Making an association between logical tape and physical tape.

A command within a MTFS is created to enable assignment of a physical tape to a logical tape. The MTFS accepts the command and writes information of the assigned physical tape and the library containing the physical tape, into the index file of the MTFS. Of course, this example is not intended to limit any embodiments and/or approaches described herein.

The MTFS may be configured to automatically select a tape one by one from each of the lower LE systems and make the assignment. Alternatively and/or additionally, the MTFS may be configured to monitor tape capacity during operation and add a physical tape to be assigned dynamically as needed. Alternatively and/or additionally, MTFS may be configured to allow users to specify the size of the logical tape when making an assignment.

Example 2

Writing a file into a logical tape cartridge USR001L7

In the file system provided by the MTFS, a logical tape cartridge may be presented as a subfolder. Assume in the present example that the mount point: /mnt/mtfs, /mnt/mtfs/USR001L7 is presented to users as the subfolder.

A user issues a command for writing a file, e.g., cp~/myfile.dat/mnt/mtfs/USR001L7.

The MTFS receives the request to write, refers to the index file of USR001L7, and recognizes that USR001L7 is associated with PHY001L7 of the library 0000LB123456_L00.

The MTFS temporarily caches the file received from the user, and issues a request for writing the cached file to the server that has activated the LE system using the library 0000LB123456_L00. In this processing, the MTFS inserts the logical tape cartridge name:

```
scp ~/cachefile
libraryserver:/mnt/ltfs/PHY001L7/USR001L7/myfile.dat
```

It should be noted that although a secure copy (scp) command is used for purposes of an example, the scp command may, in some approaches, not be used, e.g., depending on the communication method between the MTFS system and the lower LE system.

Upon completion of processing, the MTFS updates its index file.

Example 3

Reading the file from the logical tape cartridge USR001L7.

In a file system provided by the MTFS, a logical tape cartridge is presented to users as a subfolder. Thus, an access to the file may be made under the directory /mnt/mtfs/USR001L7, e.g., using: cp/mnt/mtfs/USR001L7/myfile.dat~

The MTFS receives the read request and identifies, on the basis of the index file, a lower layer LE system which keeps the file. A request is issued for reading the file to the LE system. For example, a scp command may be used.

The MTFS sends the file read from the lower LE system to the user.

Using the implementation of the present example, a logical tape cartridge can be assigned to a plurality of physical tape cartridges. This is beneficial because one physical tape can keep data of a plurality of logical tapes. For example, it is possible to associate logical tape (A) with physical tapes (a) and (b), and associate logical tape (B) with physical tapes (b) and (c).

Additionally, physical tapes associated with one logical tape to be managed by different tape libraries.

Writing to a Plurality of Physical Tapes of MTFS

An example detailing writing to a plurality of physical tapes of MTFS will now be described.

When the MTFS writes a file into a tape, such as in the above example, the MTFS may write into not only one physical tape cartridge but also into a plurality of physical tape cartridges in parallel.

When a file thereby recorded on the plurality of physical tape cartridges is read in the read processing of the example above, the MTFS may select and use one physical tape cartridge from the plurality of physical tape cartridges that allows faster reading than other physical tape cartridges, on the basis of the use situation of each of those physical tape cartridges.

Example

The physical tape cartridges associated with a logical tape cartridge are each scored in accordance with the following rules:

The tape cartridge is mounted on a drive and is not currently being used for a process: 5

The tape cartridge is not mounted on a drive and is not currently being used for a process: 4

The tape cartridge is mounted on a drive and is currently being used for a process: 3

The tape cartridge has been moved to the outside of the library: 0

Of course, the scores assigned in the present example are for purposes of a non-limiting example only. Accordingly, any scoring system may be applied to such cases.

The MTFS uses one of the physical tape cartridges that obtains the highest score. Any of a plurality of physical tape cartridges which obtain the same highest score may be used. Further, the MTFS may be configured to select a tape cartridge from which the data can be read in a shorter time period, by taking into account the position of the head relative to the data on the tape, or the like in the tape cartridge.

Further, the same file may be read from the plurality of tapes at the same time. In this case, a former part of the file and a latter part of the file may be separately read and combined to form the complete file.

Where duplication is applied to all the files in a data storage system, the effective storage capacity of the whole system will be reduced in half. However, it is advantageous if a larger number of duplicates are stored in the system, in view of the improvement in the reliability and accessibility of the data. Accordingly, in some approaches, a number of duplicates and/or which data to duplicate may be determined according to the use case of the system.

When emphasizing the accessibility and the reliability of data, data is preferably stored in a plurality of tape cartridges as duplicates to maintain redundancy of data. Furthermore, data may be duplicated across libraries installed at remote sites so as to prevent data loss in the event of disasters.

Meanwhile, when emphasizing the capacity, the number of physical tape cartridges on which duplicates of data are stored, and/or the amount of data that is duplicated, may be controlled according to some criteria such as the frequency of accesses to the data. For example, for a file to which no access is made in a certain period of time, one duplicate of the file may be deleted from one of the plurality of physical tapes. By implementing this feature, a balance between capacity and accessibility can be established.

One or more algorithms may be used when selecting a physical tape from which the data is deleted. For example, the physical tape from which the data is deleted may be selected so that as many files as possible are aggregated in one tape, or, on the contrary, files are distributed over as many different tapes as possible. It should be noted, that due to the nature of tape storage being a sequential write medium, such processing may include an operation called "reclaim," which copies only valid data to other medium(s), for purposes of reusing tape cartridges. When dynamically controlling the number of duplicates in the various embodiments and/or approaches herein, reclaim operations may be regularly performed.

The benefits of various embodiments and/or approaches described herein should further be considered in view of conventional Redundant Array of Independent Disks (RAID) techniques. For example, conventional RAID techniques often utilize a plurality of sets of physical tapes, and as a result may have issues with maintaining the combinations of sets of physical tapes. In contrast, various embodiments and/or approaches described herein enable reading a file, e.g., instance of data, using only a single physical tape in some approaches, without having to maintain specific combinations of physical tapes.

Additionally, various embodiments and/or approaches described herein should not be interpreted as simply making duplicates of data. Rather, the various embodiments and/or approaches described herein enable effective utilization of a storage capacity of a system, by reducing the number of duplicates of instances of data that have a relatively low access frequency. Meanwhile, data having a relatively high access frequency are awarded, e.g., duplicity, a higher priority, placement in a cache, placement on a physical tape of a storage library reserved for frequently used data, etc. Accordingly, based on use of data in a plurality of storage libraries, data characterized as having a relatively high access frequency and/or priority may be, e.g., migrated to quickly accessible portions of a storage system, duplicated, not deleted from physical tape, etc.

File Duplication by MTFS

An example detailing file duplication by MTFS will now be described.

Elsewhere above, the descriptions of writing data to a plurality of physical tapes describe securing capacity within a storage system by reducing the number of duplicates of files having a low access frequency. Meanwhile, files with a particularly high access frequency may be duplicated in separate tapes in separate libraries.

In one example, for a file with a predetermined number of accesses in a predetermined period of time, the frequency of the accesses to the file may be counted and recorded. After the predetermined period of time passes, in response to determining that a file has an access frequency greater than a predetermined threshold value, the MTFS creates a duplicate in a physical tape cartridge selected from the physical tape cartridges corresponding to the logical tape cartridge (provided that the physical tape of the selected cartridge does not already contain a duplicate of the file). The MTFS creates the duplicate by making a copy of the file through the MTFS.

In order to duplicate data, a MTFS may instruct a lower layer LE system to create a duplicate of data in a separate physical tape and move the physical tape to a different storage library with a relatively faster access time. Of course, the methods for making duplicates of data are not limited thereto, e.g., see other approaches and/or embodiments described elsewhere herein.

Moreover, various approaches and/or embodiments described herein do not simply maintain files redundantly. Instead, various approaches and/or embodiments described herein enable distribution of data across physical tapes. From this, a reduction of network load associated with duplication will result. Accordingly, various ones of the approaches and/or embodiments described herein may prove particular useful for moving a large number of data files each having a large data size from one storage library to a different storage library.

Figure 13:
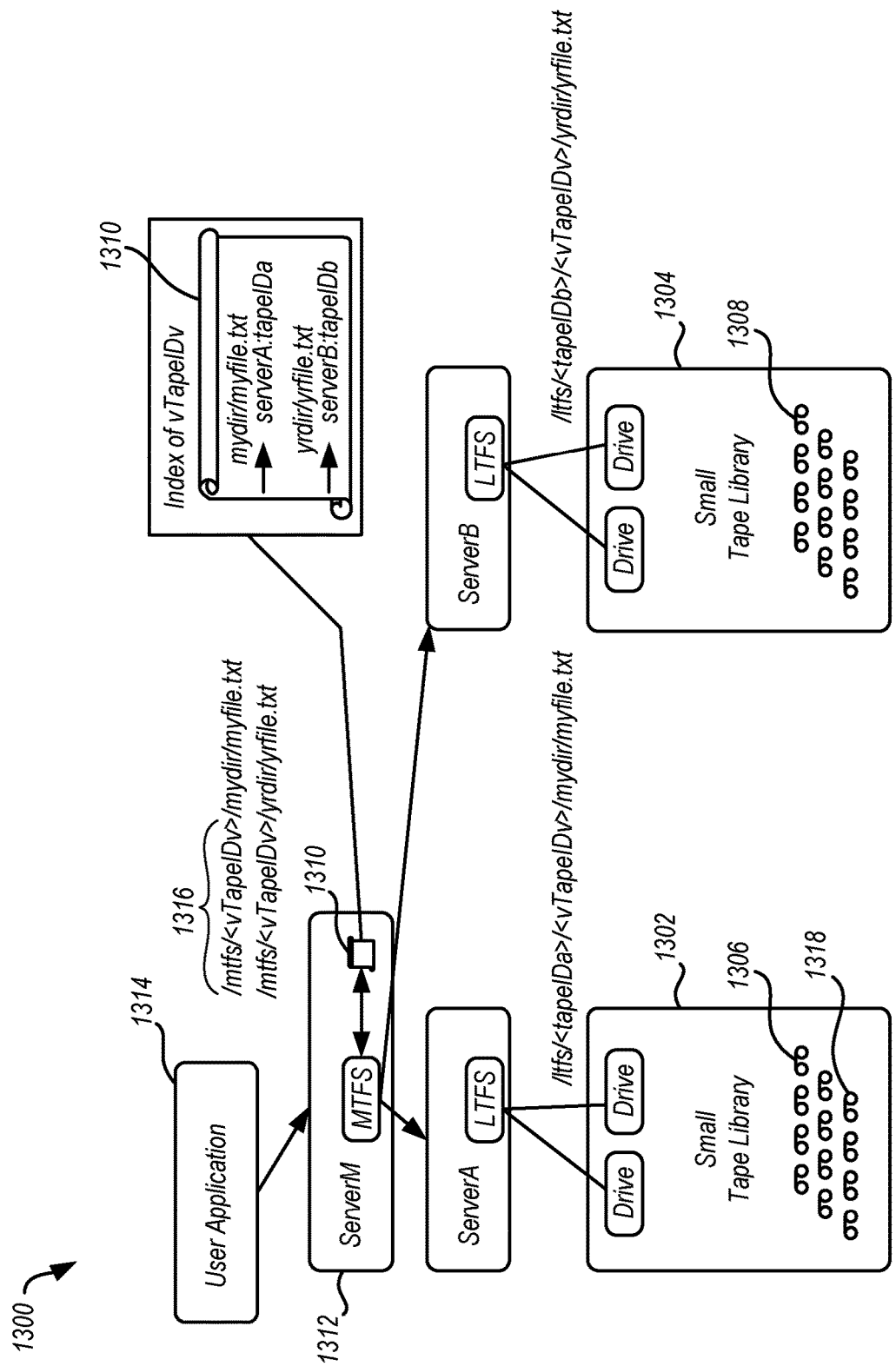
FIG. 13 is a diagram of a data storage system in accordance with one embodiment.

FIG. 13 depicts a data storage system 1300, in accordance with one embodiment. As an option, the present data storage system 1300 may be implemented in conjunction with features from any other embodiment listed herein, such as those described with reference to the other FIGS. Of course, however, such data storage system 1300 and others presented herein may be used in various applications and/or in permutations which may or may not be specifically described in the illustrative embodiments listed herein. Further, the data storage system 1300 presented herein may be used in any desired environment.

Data storage system 1300 includes a first physical tape 1306 of a first storage library 1302 and a second physical tape 1308 of a second storage library 1304. Similar to operation 1002 of method 1000, the first physical tape 1306 and the second physical tape 1308 may be associated with a logical tape. Note that in FIG. 13, software of serverM 1312 is running MTFS. Accordingly, the logical tape is displayed to a user application 1314 as residing on the serverM 1312.

The association includes writing a first location identifier, e.g., /mtfs/<vTapeIDv>/mydir/myfile.txt, to an index 1310 of the logical tape vTapeIDv. The first location identifier represents the first physical tape 1306 and the first storage library 1302. Moreover, the association includes writing a second location identifier, e.g., /mtfs/<vTapeIDv>/yrdir/yrfile.txt, to the index 1310 of the logical tape vTapeIDv.

The second location identifier represents the second physical tape 1308 and the second storage library 1304.

The index 1310 of the logical tape vTapeIDv is stored in memory, e.g., of the MTFS.

Moreover, the logical tape vTapeIDv is displayed by reading the index 1310 from memory as a file system. For example, note that the user application 1314 can access physical tapes 1306, 1308 of either of the storage libraries 1302, 1304 via the logical tape vTapeIDv, without having to know in which storage library the requested data resides. This is because the index 1310 of the logical tape vTapeIDv accounts for such information. Accordingly, despite data storage system 1300 including a plurality of servers, e.g., ServerA and ServerB, associated with the storage libraries 1302, 1304, the access path of each of the servers from the user application 1314 is identical, e.g., see access path 1316.

It should be noted that in various other approaches, the data storage system 1300 may include servers in addition to ServerA and ServerB and tape libraries in addition to the storage libraries 1302, 1304, e.g., a third library, a third server, a fourth library, a fourth server, and so on, in any combination, for purposes of scaling out the data storage system 1300 when doing so would benefit the data storage system 1300.

The configuration of the data storage system 1300 allows a logical tape cartridge to be assigned to a plurality of physical tape cartridges. Moreover, the configuration of the data storage system 1300 is unique in that one physical tape can store data of a plurality of logical tapes. For example, it is possible to associate a first logical tape, e.g., vTapeIDv, with physical tapes 1306, 1308, and associate a different logical tape (not shown) with physical tapes 1308, 1318.

Additionally, the configuration of the data storage system 1300 allows physical tapes associated with one logical tape to be managed by different tape libraries.

These configurations and various embodiments and/or approaches described herein provide a logical tape for a user and internally associates a plurality of physical tapes with the logical tape. Availability of access to a file of data also improves as a result of recording duplicates of the file into a plurality of tape cartridges upon a request to write the data.

It should be noted however, that the number of copies of the data will not become excessive (which would otherwise waste storage space in the system), because the number of the copies/duplicates of the data is controlled on a basis of, e.g., frequency access to the data, priority scores, etc. Moreover, data with the highest access frequently and/or priority may be placed in a higher storage tier, e.g., such as in a cache.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method for managing a first storage library and a second storage library, the computer-implemented method comprising:
    associating a first physical tape and a second physical tape with a logical tape, wherein the associating includes:
        writing a first identifier to an index of the logical tape, wherein the first identifier represents the first physical tape and the first storage library, and
        writing a second identifier to the index of the logical tape, wherein the second identifier represents the second physical tape and the second storage library;
    storing the index of the logical tape in memory;
    displaying the logical tape by reading the index from memory as a file system;
    receiving a read request for data;
    reading the index of the logical tape;
    identifying on which of the physical tapes the requested data is stored;
    assigning a priority score to each of the identified physical tapes based on an associated use of each of the identified physical tapes, wherein the priority scores are assigned such that:
        a physical tape that is mounted on a drive and is not currently being used is assigned a higher priority score than a physical tape that is not mounted in a drive and is not currently being used;
        a physical tape that is not mounted in a drive and is not currently being used is assigned a higher priority score than a physical tape that is mounted in a drive and is currently being used; and
        a physical tape that is mounted in a drive and is currently being used is assigned a higher priority score than a physical tape that has been moved outside of a library;
    determining an assigned priority score for each of the identified physical tapes; and
    selecting the physical tape having a highest of the priority scores as a source tape from which the requested data is to be read.

2. A computer-implemented method as recited in claim 1, comprising:
    in response to receiving a request to write data:
        identifying both the first physical tape and the second physical tape as a destination to which the data associated with the write request is to be written, wherein the first storage library is a location of the first physical tape, wherein the second storage library is a location of the second physical tape;
writing the data associated with the write request to both the first physical tape and the second physical tape; and
updating the index of the logical tape to reflect the written data.

3. A computer-implemented method as recited in claim 2, comprising:
receiving a read request for the written data;
reading the index of the logical tape;
identifying the first physical tape and the second physical tape as storage on which the written data is stored; and
selecting one of the first physical tape and the second physical tape as a source tape from which the written data is to be read.

4. A computer-implemented method as recited in claim 1, comprising:
determining a frequency of accesses to the requested data;
comparing the determined frequency with a predetermined threshold; and
in response to determining that the determined frequency is less than or equal to the predetermined threshold, deleting the requested data from at least one of the physical tapes.

5. A computer-implemented method as recited in claim 3, wherein selecting one of the first physical tape and the second physical tape as the source tape from which the written data is to be read includes:
determining, for each of the first physical tape and the second physical tape, a time to perform a read-back of the written data; and
selecting the physical tape having a shortest of the read-back times as the selected source tape from which the written data is to be read.

6. A computer-implemented method as recited in claim 1, comprising:
determining a frequency of accesses to data stored on both the first and second physical tapes;
comparing the determined frequency with a predetermined threshold; and
in response to determining that the determined frequency is less than or equal to the predetermined threshold, deleting the data stored on both the first and second physical tapes from at least one of the physical tapes.

7. A computer-implemented method as recited in claim 6, comprising:
in response to determining that the determined frequency is greater than the predetermined threshold, instructing the data stored on both the first and second physical tapes to be written to a cache.

8. A computer-implemented method as recited in claim 6, comprising:
in response to determining that the determined frequency is greater than the predetermined threshold, instructing the data stored on both the first and second physical tapes to be written to a third physical tape in a third storage library;
associating the third physical tape with the logical tape, wherein the associating includes:
writing a third identifier to the index of the logical tape, wherein the third identifier represents the third physical tape and the third storage library; and
updating the index of the logical tape to reflect the written data.

9. A computer program product for managing a first storage library and a second storage library, the computer program product comprising a computer readable storage medium having program instructions embodied therewith, wherein the computer readable storage medium is not a transitory signal per se, the program instructions readable and/or executable by a controller to cause the controller to perform a method comprising:
associating, by the controller, a first physical tape and a second physical tape with a logical tape, wherein the associating includes:
writing a first identifier to an index of the logical tape, wherein the first identifier represents the first physical tape and the first storage library as a location of the first physical tape, and
writing a second identifier to the index of the logical tape, wherein the second identifier represents the second physical tape and the second storage library as a location of the second physical tape;
storing, by the controller, the index of the logical tape in memory;
displaying, by the controller, the logical tape by reading the index from memory as a file system;
in response to receiving a request to write data:
identifying, by the controller, both the first physical tape and the second physical tape as a destination to which the data is to be written;
writing, by the controller, the data to both the first physical tape and the second physical tape; and
updating, by the controller, the index of the logical tape to reflect the written data, wherein the index of the logical tape is stored in a different type of memory than a memory in which the logical tape is stored.

10. A computer program product as recited in claim 9, the program instructions readable and/or executable by the controller to cause the controller to perform the method comprising:
receiving, by the controller, a read request for the written data;
reading, by the controller, the index of the logical tape;
identifying, by the controller, the first physical tape and the second physical tape as storage on which the written data is stored; and
selecting, by the controller, one of the identified physical tapes as a source tape from which the written data is to be read.

11. A computer program product as recited in claim 9, the program instructions readable and/or executable by the controller to cause the controller to perform the method comprising:
determining, by the controller, a frequency of accesses to the written data;
comparing, by the controller, the determined frequency with a predetermined threshold; and
in response to determining that the determined frequency is less than or equal to the predetermined threshold, deleting, by the controller, the written data from at least one of the physical tapes.

12. A computer program product as recited in claim 9, the program instructions readable and/or executable by the controller to cause the controller to perform the method comprising:
receiving, by the controller, a read request for data;
reading, by the controller, the index of the logical tape;
identifying, by the controller, on which of the physical tapes the requested data is stored; and selecting, by the controller, one of the first physical tape and the second physical tape as a source tape from which the requested data is to be read.

13. A computer program product as recited in claim 12, wherein selecting the source tape from which the requested data is to be read includes:
   determining, by the controller for each of the physical tapes identified as having the requested data stored thereon, a time to perform a read-back of the requested data; and
   selecting, by the controller, the physical tape having a shortest of the read-back times as the selected source tape.

14. A computer program product as recited in claim 12, wherein selecting the source tape from which the requested data is to be read includes:
   assigning, by the controller, a priority score to each of the physical tapes identified as having the requested data stored thereon, wherein the assigning of priority scores is based on an associated use of each of the physical tapes identified as having the requested data stored thereon, wherein the priority scores are assigned such that:
      a physical tape that is mounted on a drive and is not currently being used is assigned a higher priority score than a physical tape that is not mounted in a drive and is not currently being used;
      a physical tape that is not mounted in a drive and is not currently being used is assigned a higher priority score than a physical tape that is mounted in a drive and is currently being used; and
      a physical tape that is mounted in a drive and is currently being used is assigned a higher priority score than a physical tape that has been moved outside of a library;
   determining, by the controller, an assigned priority score for each of the physical tapes identified as having the requested data stored thereon; and
   selecting, by the controller, the physical tape having a highest of the priority scores as the selected source tape from which the requested data is to be read.

15. A computer program product as recited in claim 9, the program instructions readable and/or executable by the controller to cause the controller to perform the method comprising:
   determining, by the controller, a frequency of accesses to data stored on both the first and second physical tapes;
   comparing, by the controller, the determined frequency with a predetermined threshold; and
   in response to determining that the determined frequency is less than or equal to the predetermined threshold deleting, by the controller, the data stored on both the first and second physical tapes from at least one of the physical tapes.

16. A computer program product as recited in claim 15, the program instructions readable and/or executable by the controller to cause the controller to perform the method comprising:
   in response to determining that the determined frequency is greater than the predetermined threshold, instructing, by the controller, the data stored on both the first and second physical tapes to be written to a third physical tape in a third storage library;
   associating, by the controller, the third physical tape with the logical tape, wherein the associating includes:
      writing a third identifier to the index of the logical tape, wherein the third identifier represents the third physical tape and the third storage library; and
   updating, by the controller, the index of the logical tape to reflect the data written to the third physical tape.

17. An apparatus, comprising:
   a processor; and
   logic configured to cause the processor of the apparatus to:
      associate, by the processor, a first physical tape of a first storage library and a second physical tape of a second storage library with a logical tape, wherein the associating includes:
         writing a first identifier to an index of the logical tape, wherein the first identifier represents the first physical tape and the first storage library, and
         writing a second identifier to the index of the logical tape, wherein the second identifier represents the second physical tape and the second storage library;
      store, by the processor, the index of the logical tape in memory;
      receive, by the processor, a read request for data;
      read, by the processor, the index of the logical tape;
      identify, by the processor, on which of the physical tapes the data is stored; and
      select, by the processor, one of the identified physical tapes as a source tape from which the data is to be read,
      wherein the selection is based on a previously assigned priority score of the selected physical tape,
      wherein the previously assigned priority score of the selected physical tape is based on an associated use of each of the identified physical tapes.

* * * * *